United States Patent
Coppola

(10) Patent No.: US 6,783,301 B2
(45) Date of Patent: Aug. 31, 2004

(54) UNDERWATER LINE BUNDLER

(76) Inventor: Richard Coppola, P.O. Box 99, Langhorne, PA (US) 19047

( * ) Notice: Subject to any disclaimer, the term of this patent is extended or adjusted under 35 U.S.C. 154(b) by 0 days.

(21) Appl. No.: 10/447,508

(22) Filed: May 30, 2003

(65) Prior Publication Data

US 2004/0018058 A1 Jan. 29, 2004

Related U.S. Application Data

(60) Provisional application No. 60/398,553, filed on Jul. 26, 2002.

(51) Int. Cl.$^7$ .............................. H02G 15/00; F16L 1/20
(52) U.S. Cl. .......................................... 405/167; 174/79
(58) Field of Search ................................ 405/156, 157, 405/158, 167, 168.1, 168.2; 174/74 R, 77 R, 79, 84 R, 85, 93

(56) References Cited

U.S. PATENT DOCUMENTS

| | | | | |
|---|---|---|---|---|
| 4,506,430 A | * | 3/1985 | Guzay, Jr. ..................... | 29/450 |
| 5,098,752 A | * | 3/1992 | Chang et al. ............... | 428/34.9 |
| 5,169,176 A | * | 12/1992 | Brossard .................... | 285/21.1 |
| 5,171,940 A | * | 12/1992 | Vallauri ..................... | 174/73.1 |
| 5,753,861 A | * | 5/1998 | Hansen et al. ................ | 174/93 |
| 6,245,999 B1 | * | 6/2001 | Costigan et al. .......... | 174/74 A |

* cited by examiner

*Primary Examiner*—Thomas B. Will
*Assistant Examiner*—Tara L. Mayo

(57) ABSTRACT

In order to solve problems in the art, the present invention has been devised to bundle underwater tubing, hoses, cables, lines and other similar structures. The invention includes the use of an ambient temperature shrink device requiring no external heat source, temperature modification, change, or external devices or influence to install the bands.

It is well known to unite several underwater hoses, tubes and cables by simply taping them together with the product commonly called "duct tape." however the duct tape constantly rips, delaminates, unwraps, wears away, comes off and cannot be decontaminated easily. Furthermore, its leaves an adhesive residue and is unprofessional looking. Finally, it requires excessive effort to remove. For these reasons, there is a need in the art for a new system to bundle tubing, hoses, cables and other similar structures used in underwater applications which overcomes the above disadvantages described with regard to presently used technique of taping the elements together. Furthermore, no artificial heating or cooling is required for installation either by tool or equipment generated heating or cooling or application of any external forces.

3 Claims, 5 Drawing Sheets

(5 of 5 Drawing Sheet(s) Filed in Color)

180
UNDERWATER LINE BUNDLER

This Application claim priority of Provisional Patent Application filed by the first Inventor named herein under Application No. 60/398,553 with the filing date of: Jul. 26, 2002, attached hereto.

FIELD OF THE INVENTION

The present invention relates to devices for bundling elongated underwater use objects such as tubing hoses, cables, lines and other similar structures. More specifically, it relates to means for joining these objects which circumferentially strap, bind, bundle or tie these elements together in underwater applications.

BACKGROUND OF INVENTION

Referring now to FIG. 1, it is well known to unite several underwater hoses, tubes and cables by simply taping them together with the product commonly called "duct tape." however the duct tape constantly rips, delaminates, unwraps, wears away, comes off and cannot be decontaminated easily. Furthermore, its leaves an adhesive residue and is unprofessional looking. Finally, it requires excessive effort to remove. For these reasons, there is a need in the art for a new system to bundle tubing, hoses, cables and other similar structures used in underwater applications which overcomes the above disadvantages described with regard to presently used technique of taping the elements together.

BRIEF DESCRIPTION OF THE DRAWINGS/PHOTOGRAPHS

The file of this patent contains at least one drawing executed in color. Copies of this patent with color drawings will be provided by the Patent and Trademark Office upon request and payment of the necessary fee.

DESCRIPTION OF THE INVENTION

In order to solve problems in the art, the present invention has been devised to bundle underwater tubing, hoses, cables, lines and other similar structures. The invention includes the use of an ambient temperature shrink device requiring no heat, temperature change, or external devices or influence to install the bands.

Figure 1:
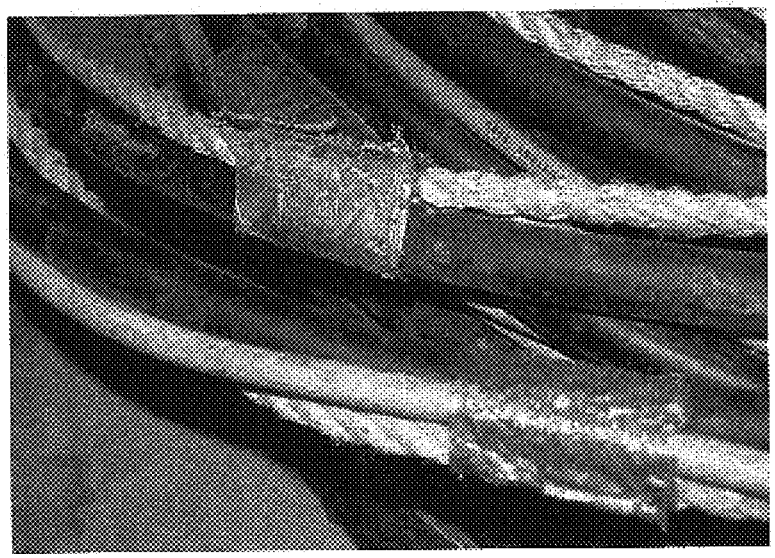
FIG. 1 is a top right front view showing the prior art way of wrapping diving and other umbilicals simply using tape.
Figure 2:
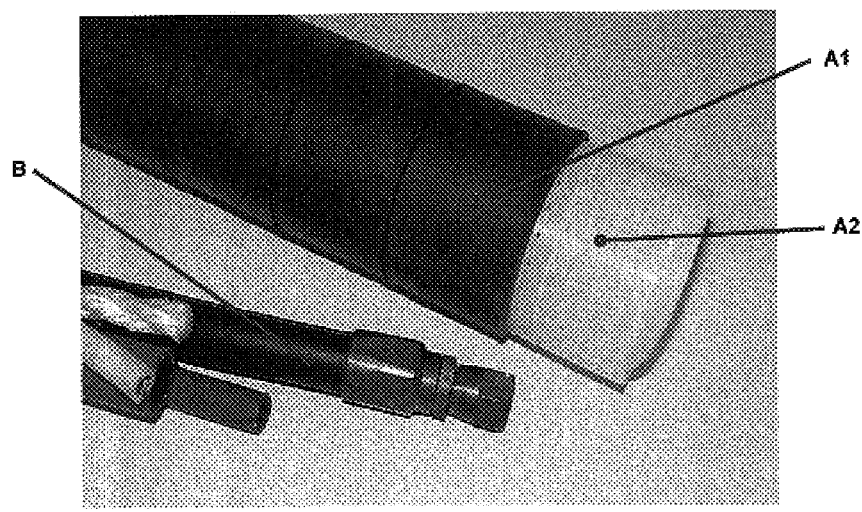
FIG. 2 is a top front isometric view showing step one of utilizing the banding system of the present invention which requires properly sizing the band to the diameter of the component/element group.

Referring now to FIG. 2, a shrinkable band (a1) and the integrated core intersupport collar also referred to herein as the banding tube (a2) is selected to closely fit the tubing, hoses, cables, lines and other similar components/elements such as the underwater umbilical component/element group shown (b), in this case, flexible hoses, cables and lines. It should be understood that any combination of flexible, elongated members/components and elements may be suitable for bundling by the present invention and method. Additional applications and uses are described below.

Figure 3:
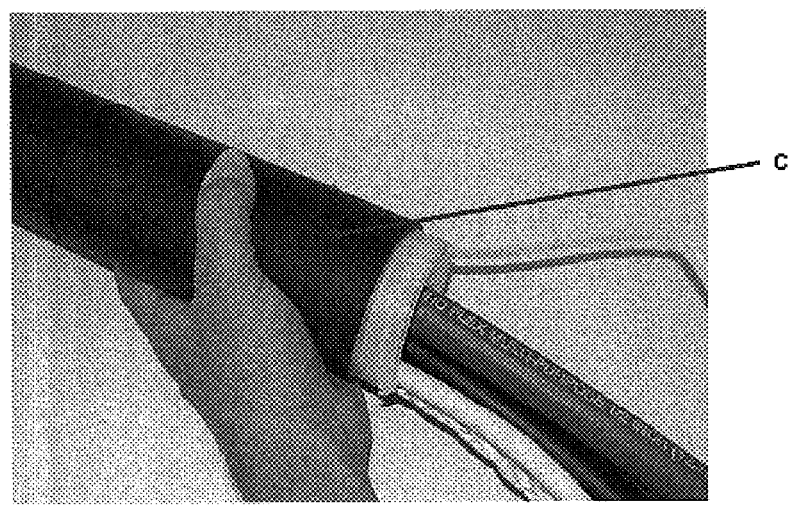
FIG. 3 is a top right isometric view showing the second step in utilizing the present invention in which the shrinkable bands mounted on their inter-support core/collar are placed around the component/element group.

Referring now to FIG. 3, the appropriately sized banding tube with precut bands to desired widths is fitted over the ends of the components/elements (c)—it is not a tight fit.

Figure 4:
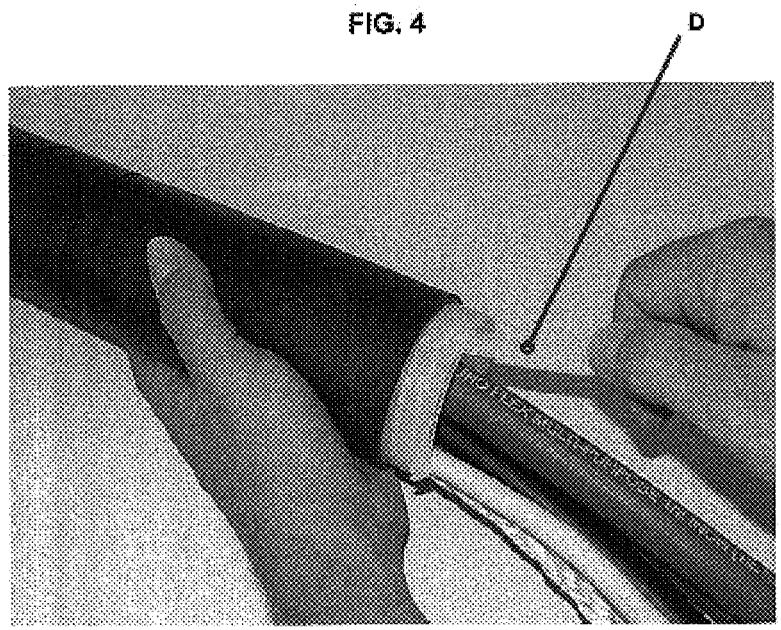
FIG. 4 is a top right perspective view showing the pulling of the core tab utilized in the third step of the present invent in which the band(s) are released from the core/intersupport collar to the component/element group.

Next, as shown in FIG. 4, is the spiral core/intersupport collar tab to be pulled through the inside of the core/intersupport collar in order to release the precut bands to the component/element group. (d)

Figure 5:
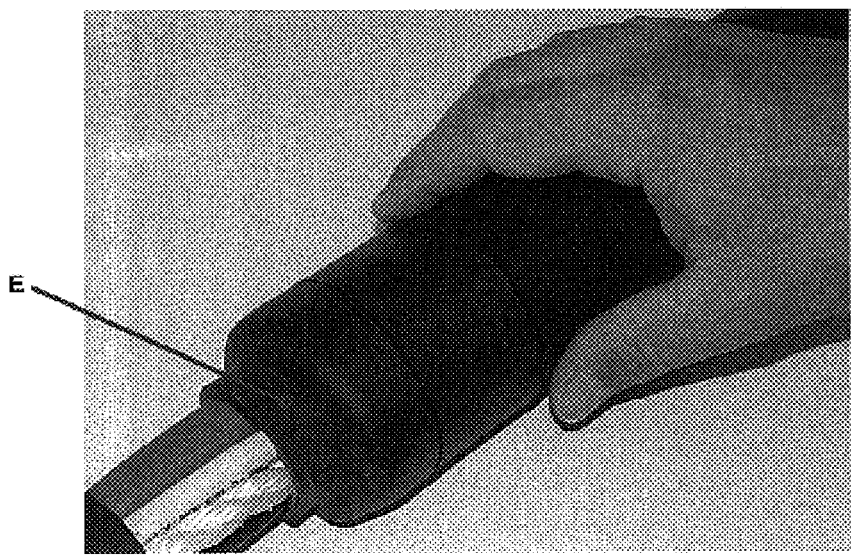
FIG. 5 is a top isometric view of the progression of a band release in process where the core/intersupport collar is beginning to be pulled away from the band and the band beginning to shrink around the component/element group.

Referring now to FIG. 5, is the initiation of the bundling process by pulling on the core/intersupport collar. The first band on the banding as shown is immediately beginning to shrink with the progressive absence of the core/intersupport collar tightly around the component/element group. (e)

Figure 6:
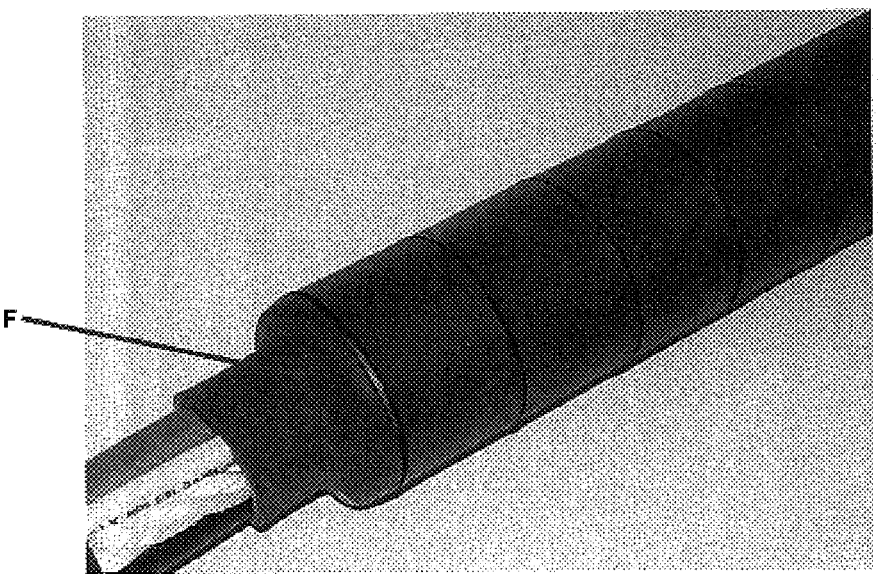
FIG. 6 is a top left perspective view of the progression of a band release where a significant portion of the band has been released and shrunk around the component/element group.

Referring now to FIG. 6, the shrinking process progresses by continuously pulling on the core/intersupport collar tab thereby releasing more of the band to the component/element group. (f)

Figure 7:
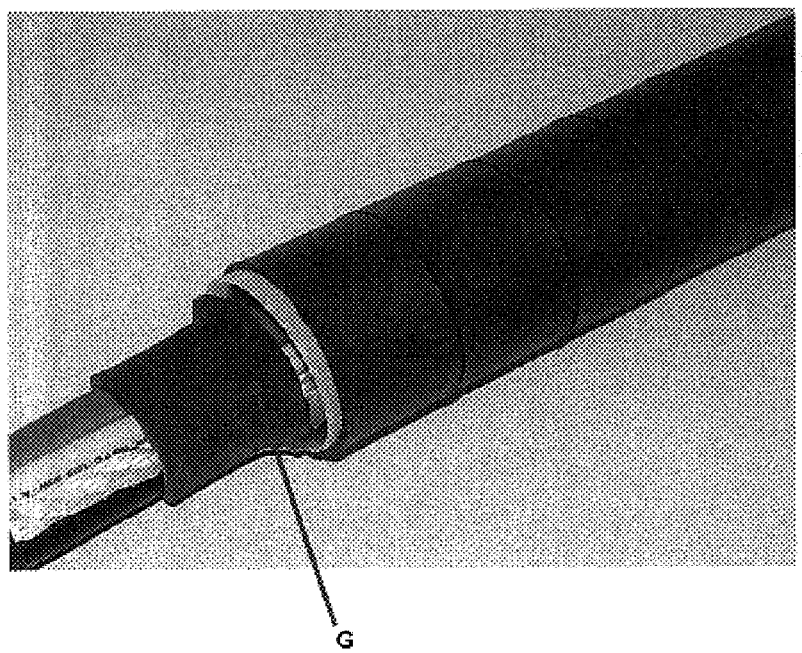
FIG. 7 is a top left perspective view of the progression of a band release where almost all the band has been released and shrunk around the component/element group. The core/intersupport collar is also visible.

Referring now to FIG. 7, is the almost total release of the band and immediate shrinking process of the band around the component/elements. (g)

Figure 8:
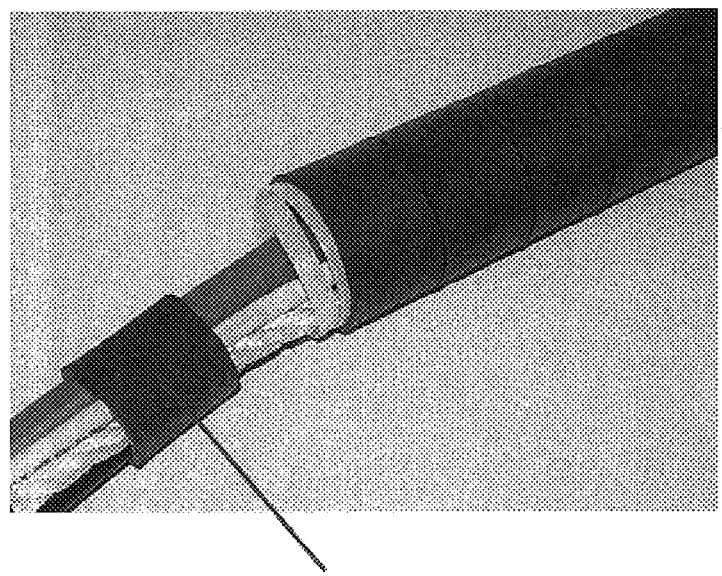
FIG. 8 is a top left perspective view of a fully released band to the umbilical/element group, and the next band on the core/intersupport collar is ready to be installed

Referring now to FIG. 8, is the total release and installation of the band thereby bundling the component/element group. The next band is now ready for installation by positioning the banding tube to the desired location along the component/element group by continuing to pull on the core/intersupport collar tab as detailed above. (h) This process of band installation is repeated for each band on the banding tube. Additional tubes are used to continue the bundling process until completed.

The above-described invention solves the above enumerated problems in the prior art and provides the following distinct advantages.

1. It is simple it is a one piece rubber material that is easily applied to the component/element group in ambient atmospheric and material temperature conditions requiring no extra installation support tools, equipment or materials.

2. Once installed, the band(s) are strong. The bands are made of a high strength rubber and will not rip, tear or wear away. Band edges can be angled, chamfered or rounded. Once installed, they have a lower profile than duct tape thereby reducing possible damage from friction.

3. The bands are not only strong but they are also rugged because they are abrasion resistant and impervious to petroleum and other products.

4. Adding component/elements on the fly is as easy as the original installation. The installer simply selects the same size banding tube originally selected and slides it over the new component/element and existing bundle. Upon positioning and installation of the additional band(s), the existing band(s) can be cut off or left in place.

5. The use of the present invention is extremely cost effective because it reduces the labor cost of the present system which requires employees to periodically re-tape underwater umbilicals and multi-element components. Thus, the present invention reduces labor costs and is more durable and long-lasting.

6. The present invention is extremely clean since the bands are one piece and exhibit an impervious finish permitting easy cleaning and decontamination. They will not attract or trap small particles or debris.

7. The present invention provides an enhanced aesthetic appearance which gives a functional performance and professional appearance.

8. The bands may be marked by imprinting or color-coding.

The above advantages over the prior art taping system may not only be used to bundle tubing, hoses, cables, lines and the like, but may also provide the following additional functions:

1. They may be used as stop guides for tubing, hoses, cables, lines and other components.

2. They may be used for flex control for tubing, hoses, cables, lines and other flexible component ends, transition points or anywhere along the component or element.

3. They may be used to bundle/bind underwater hardware, accessories, equipment, tubing, hoses, lines, cables, conduits and other components or elements in general industrial, submerged fossil, hydroelectric, or nuclear equipment and facilities, water flow control facilities in cold, warm or hot water environments.

4. They may be used in securing, installing, or adding: brackets, braces, rings, ring straps, tools, equipment sensors, locating devices, accessories, and other hardware to underwater diving bells, saturation systems, atmospheric diving systems, remote operated vehicles, autonomous vehicles, diving helmets, masks, suits, tanks, pressure and other type hoses, lines, tools instruments and equipment.

5. They may be used as a fitting lock if installed over threaded components and junctions to keep the hardware from loosening.

6. They may be used as a shipping and storage cap guard for high pressure SCUBA tank and other industrial tank valves thereby protecting the valve or regulator and other stems, seats, O-rings and other components. They may be similarly used as a cap guard for other consumer and industrial air and gas cylinder/container valves, regulator and other stems seats, O-rings and other components.

The above advantages and uses may be employed in any area of application limited only by the imagination of the user. For example, in just the underwater applications, the banding method of the present invention may be employed on the following applications.

1. Underwater and marine umbilicals composed of two or more components.

2. Commercial, recreational, scientific, and other underwater diving equipment including underwater instrumentation, underwater vehicles, sensors, probes and components.

3. Underwater instrument umbilicals and elements.

4. Tool umbilicals and elements including hydraulic, electric, air or water powered.

5. Underwater communication umbilicals and elements including video, audio, electronic, optical, or solar.

6. General underwater marine equipment and materials.

7. As mentioned above, bundled or individual elements consisting of tubing, hoses, air, electronic and fluid conduits whether flexible or rigid.

I claim:

1. A flexible underwater bundling device joining elongated objects without the use or application of heating, cooling, tools or external mechanical force for installation and operation by circumferenfially strapping and bundling said elongated objects together for underwater applications, the device comprising:

A single layer of pre-tensioned elastic material including at least one band, said at least one band being joined with the exterior of an inner support collar adapted to receive said elongated objects therein;

Wherein said inner support collar is scored or machined on its inner surface for the progressive removal of said inner support collar from said pre-tensioned elastic material;

Wherein a diameter of the at least one band is reduced upon the progressive removal of the inner support collar thereby providing circumferential binding force to said elongated objects; and Wherein the pre-tensioned elastic material does not require additional elements to bind said elongated objects for installation or stability.

2. The device of claim 1 wherein said elongated objects are selected from the group Consisting of tubes, lines, wires, cables and hoses.

3. The device of claim 1 wherein said inner support collar is removed incrementally to release said at least one band from said inner support collar.

* * * * *